(12) United States Patent
Kadowaki

(10) Patent No.: US 9,624,391 B2
(45) Date of Patent: Apr. 18, 2017

(54) WATER-BASED INK COMPOSITION AND WATER-BASED BALLPOINT PEN

(71) Applicant: Zebra Co., Ltd., Shinjuku-ku, Tokyo (JP)

(72) Inventor: Hiroyuki Kadowaki, Tokyo (JP)

(73) Assignee: ZEBRA CO., LTD., Shinjuku-Ku, Tokyo (JP)

( * ) Notice: Subject to any disclaimer, the term of this patent is extended or adjusted under 35 U.S.C. 154(b) by 0 days.

(21) Appl. No.: 14/758,008

(22) PCT Filed: Dec. 20, 2013

(86) PCT No.: PCT/JP2013/084338
§ 371 (c)(1),
(2) Date: Jun. 26, 2015

(87) PCT Pub. No.: WO2014/103959
PCT Pub. Date: Jul. 3, 2014

(65) Prior Publication Data
US 2015/0376423 A1 Dec. 31, 2015

(30) Foreign Application Priority Data
Dec. 27, 2012 (JP) .................................. 2012-285225

(51) Int. Cl.
*C09D 11/18* (2006.01)
*B43K 7/02* (2006.01)
(Continued)

(52) U.S. Cl.
CPC ............... *C09D 11/18* (2013.01); *B43K 7/005* (2013.01); *B43K 7/02* (2013.01); *B43K 7/03* (2013.01);
(Continued)

(58) Field of Classification Search
CPC combination set(s) only.
See application file for complete search history.

(56) References Cited

U.S. PATENT DOCUMENTS 4,969,951 A 11/1990 Koike et al.
7,374,278 B2 * 5/2008 Ando .................... C09D 11/16
347/100
(Continued)

FOREIGN PATENT DOCUMENTS

CN 1518583 A 8/2004
CN 1829778 A 9/2006
(Continued)

OTHER PUBLICATIONS

International Search Report corresponding to Application No. PCT/JP2013/084338; Date of Mailing: Mar. 25, 2014, with English translation.
(Continued)

*Primary Examiner* — David Walczak
(74) *Attorney, Agent, or Firm* — Cantor Colburn LLP

(57) ABSTRACT

A water-based ink composition capable of forming depicted lines with excellent drying property and with little bleed is described. Also, a water-based ballpoint pen using the water-based ink composition is described. The water-based ink composition includes a polyoxyethylene alkyl ether, a water-soluble organic solvent, a colorant and water, wherein the HLB value of the polyoxyethylene alkyl ether is from 14 to 15, and wherein the polyoxyethylene alkyl ether has an alkyl group contains 8 to 10 carbon atoms.

7 Claims, 1 Drawing Sheet

(51) Int. Cl.
*B43K 7/03* (2006.01)
*B43K 7/08* (2006.01)
*B43K 7/00* (2006.01)
*C09D 11/00* (2014.01)
*C08K 5/06* (2006.01)

(52) U.S. Cl.
CPC ............... *B43K 7/08* (2013.01); *C08K 5/06* (2013.01); *C09D 11/00* (2013.01)

(56) References Cited

U.S. PATENT DOCUMENTS

| | | | |
|---|---|---|---|
| 7,441,976 B2* | 10/2008 | Kitaoka | B43K 7/00 106/31.13 |
| 8,403,579 B2* | 3/2013 | Kitaoka | B43K 7/02 106/31.13 |
| 2012/0050383 A1 | 3/2012 | Takayama et al. | |

FOREIGN PATENT DOCUMENTS

| | | |
|---|---|---|
| EP | 1266770 A1 | 12/2002 |
| EP | 1591499 A1 | 11/2005 |
| JP | S5566979 A | 5/1980 |
| JP | S60115674 A | 6/1985 |
| JP | S60238375 A | 11/1985 |
| JP | S61118473 A | 6/1986 |
| JP | S61118474 A | 6/1986 |
| JP | S61118476 A | 6/1986 |
| JP | S61250076 A | 11/1986 |
| JP | S61266468 A | 11/1986 |
| JP | S61266469 A | 11/1986 |
| JP | S61266470 A | 11/1986 |
| JP | S61266686 A | 11/1986 |
| JP | H10231451 A | 9/1998 |
| JP | H10298482 A | 11/1998 |
| JP | 2000007965 A | 1/2000 |
| JP | 2000103998 A | 4/2000 |
| JP | 2001311020 A | 11/2001 |
| JP | 2002371211 A | 12/2002 |
| JP | 2003012975 A | 1/2003 |
| JP | 2005281351 A | 10/2005 |
| JP | 2006241202 A | 9/2006 |
| JP | 2006299215 A | 11/2006 |
| JP | 2007031639 A | 2/2007 |
| JP | 2007231143 A | 9/2007 |
| JP | 2009235387 A | 10/2009 |
| JP | 2010001381 A | 1/2010 |
| JP | 2010189555 A | 9/2010 |
| JP | 2010222417 A | 10/2010 |
| JP | 2010222418 A | 10/2010 |
| JP | 2010275513 A | 12/2010 |
| JP | 2012233026 A | 11/2012 |
| JP | 2013036014 A | 2/2013 |
| WO | 2006016674 A1 | 2/2006 |

OTHER PUBLICATIONS

Japanese Office Action corresponding to Application No. 2014-554422; Date of mailing: Jan. 5, 2016.
English Translation of the International Preliminary Report on Patentability Chapter I and the Written Opinion of the International Searching Authority corresponding to Application No. PCT/JP2013/084338; Date of Mailing: Jul. 9, 2015.
Chinese Office Action corresponding to Patent Application No. 201380068193.8; Date of Dispatch: Apr. 21, 2016.
Chinese Office Action corresponding to Application No. 201380068193.8; Date of Mailing: Nov. 2, 2016.
Extended European Search Report corresponding to Application No. 13867085.6-1704/2940084 PCT/JP2013/084338; Date of Mailing: Aug. 3, 2016.
Korean Office Action corresponding to Patent Application No.: 10-2015-7018102; Date of Dispatch: Nov. 23, 2016.

* cited by examiner

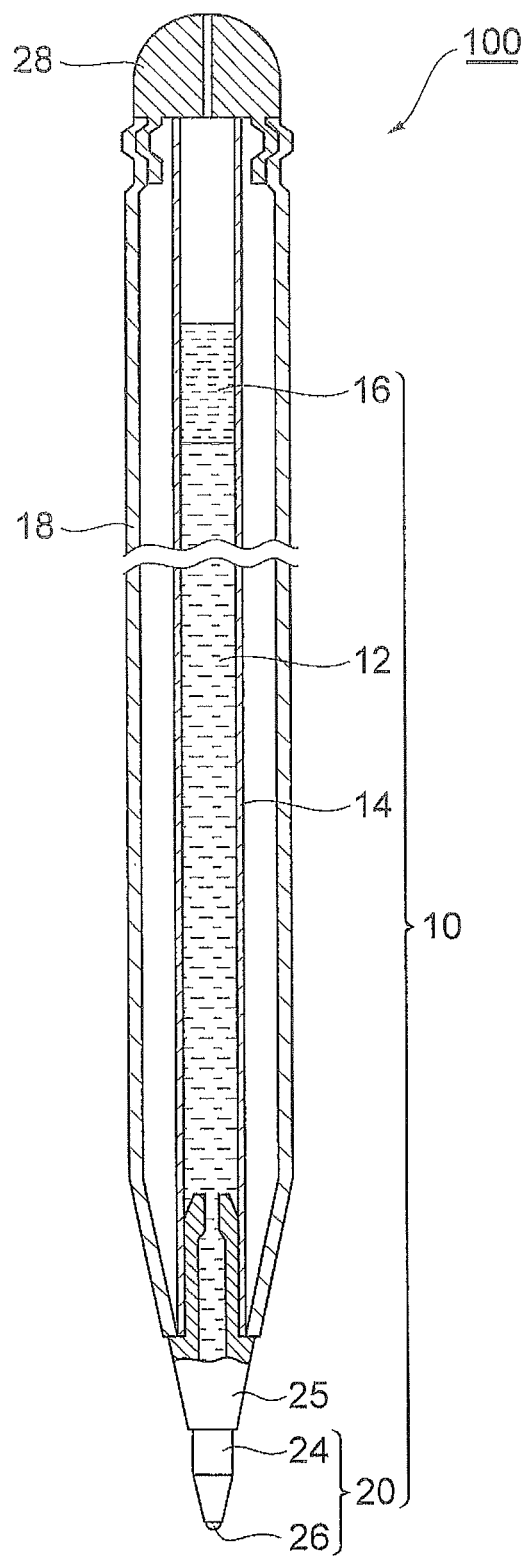

WATER-BASED INK COMPOSITION AND WATER-BASED BALLPOINT PEN

This is the U.S. national stage of application No. PCT/JP2013/084338, filed on Dec. 20, 2013. Priority under 35 U.S.C. §119(a) and 35 U.S.C. §365(b) is claimed from Japanese Application No. 2012-285225, filed Dec. 27, 2012, the disclosure of which is also incorporated herein by reference.

TECHNICAL FIELD

The present invention relates to a water-based ink composition and a water-based ballpoint pen.

BACKGROUND ART

If it takes a long time for an ink composition to be dried when depicted lines are formed on the paper with a writing instrument, the ink composition is likely to transfer between formation of the depicted lines and drying thereof, and recognition of letters or the like consisting of the depicted lines may be difficult in some cases. Therefore, excellent drying property is required for the depicted lines formed on the paper with a writing instrument.

In Patent Literature 1, a water-based ink containing a silicone-based surfactant is disclosed, and the resulting depicted lines are described to be excellent in drying property and the like. In Patent Literature 2, a water-based ink containing crosslinked gelatin is disclosed and the drying property of the resulting handwriting is described to be satisfactory.

CITATION LIST

Patent Literature

Patent Literature 1: Japanese Patent Application Laid-open No. 10-231451
Patent Literature 2: Japanese Patent Application Laid-open No. 2000-103998

SUMMARY OF INVENTION

Technical Problem

On the other hand, ink compositions for writing instruments excellent in drying property of the depicted lines have exhibited a tendency to easily bleed on the paper, thereby thickening the depicted lines or making the depicted lines unclear despite the intent of the user.

The present invention has been accomplished in view of the problem described above, and the object thereof is to provide a water-based ink composition capable of forming depicted lines excellent in drying property and with little bleed and a water-based ballpoint pen using the same.

Solution to Problem

The present invention provides a water-based ink composition comprising a polyoxyethylene alkyl ether, a water-soluble organic solvent, a colorant and water, wherein the HLB value of the polyoxyethylene alkyl ether is from 12 to 15, and wherein the polyoxyethylene alkyl ether has an alkyl group containing 8 to 12 carbon atoms.

According to the water-based ink composition of the present invention, contradicting characteristics of drying property and bleed can be made consistent with each other.

Preferably, the content of the polyoxyethylene alkyl ether is from 0.1 to 10% by mass based on the total amount of the water-based ink composition.

Preferably, the water-based ink composition further comprises a phosphate ester. In addition, preferably, the phosphate ester is a polyoxyethylene alkyl ether phosphate, and the polyoxyethylene alkyl ether phosphate has an alkyl group containing 10 or less carbon atoms.

Preferably, the content of the phosphate ester is from 0.05 to 5% by mass based on the total amount of the water-based ink composition.

Preferably, the water-based ink composition has a viscosity from 500 to 3000 mPa·s.

The present invention also provides a water-based ballpoint pen comprising an ink housing member and a ballpoint pen tip, wherein the water-based ink composition described above is housed in the ink housing member.

Advantageous Effects of Invention

According to the present invention, there can be provided a water-based ink composition capable of forming depicted lines excellent in the drying property and with little bleed and a water-based ballpoint pen using the same.

BRIEF DESCRIPTION OF DRAWINGS

FIG. 1 is a schematic cross-sectional view showing an embodiment of the water-based ballpoint pen according to the present invention.

DESCRIPTION OF EMBODIMENTS

Hereinafter, suitable embodiments of the present invention will be described in details referring to the drawing as necessary.

(Water-based Ink Composition)

The water-based ink composition according to the present embodiment comprises a polyoxyethylene alkyl ether, a water-soluble organic solvent, a colorant and water.

The polyoxyethylene alkyl ether has an alkyl group containing 8 to 12 carbon atoms. When the water-based ink composition comprises a polyoxyethylene alkyl ether, the permeability of the water-based ink composition into the paper can be enhanced. Preferably, the number of carbon atoms is from 8 to 10.

The polyoxyethylene alkyl ether is specifically represented by the following formula (1):

[Chemical Formula 1]

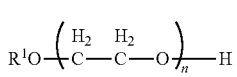

(1)

where, $R^1$ represents an alkyl group having 8 to 12 carbon atoms. When the number of carbon atoms of the alkyl group of the polyoxyethylene alkyl ether is 8 or more, bleed of the depicted lines can be reduced. When the number of carbon atoms of the alkyl group of the polyoxyethylene alkyl ether is 12 or less, the permeability of the water-based ink composition into the paper can be enhanced. From similar points of view, preferably, the number of carbon atoms of the alkyl group is from 8 to 10. Also, preferably, the alkyl group is branched. Examples of such an alkyl group include an isodecyl group and an ethylhexyl group. In the formula (1), n may be selected so that the HLB value falls within the range described below, and is, for example, an integer from 5 to 20.

The HLB (Hydrophile-Lipophile Balance) value of the polyoxyethylene alkyl ether is from 12 to 15. When the HLB value is 12 or more, dissolution stability of the polyoxyethylene alkyl ether in the water-based ink composition increases, thereby the depicted lines can be suppressed from bleeding. When the HLB value is 15 or less, the permeability of the water-based ink composition into the paper surface can be enhanced. From similar points of view, preferably, the HLB value is from 14 to 15.

Preferably, the content of the polyoxyethylene alkyl ether is from 0.1 to 10% by mass, and more preferably from 0.5 to 2% by mass based on the total amount of the water-based ink composition. When the content of the polyoxyethylene alkyl ether is 0.1% or more by mass, the permeability of the water-based ink composition into the paper tends to be enhanced. When the content of the polyoxyethylene alkyl ether is 10% or less by mass, the excellent dissolution stability tends to be attained while the permeability being retained.

Examples of the water-soluble organic solvent include ethylene glycol, diethylene glycol, triethylene glycol, polyethylene glycol, propylene glycol, ethylene glycol monomethyl ether, glycerol, pyrrolidone, urea, thiourea, ethylene urea, sorbitol, mannitol, sucrose, glucose, reduced starch hydrolyzates, and sodium pyrophosphate. The content of the water-soluble organic solvent is preferably from 1 to 30% by mass, and more preferably from 5 to 20% by mass based on the total amount of the water-based ink composition.

The colorant include dyes and pigments. Preferably, the dyes are water-soluble dyes and are, for example, direct dyes, acidic dyes and basic dyes. Preferably, the pigments are water-dispersible pigments and are, for example, organic pigments and inorganic pigments. The above colorants may be used singly or in combinations of two or more thereof.

Examples of the direct dyes include Color Index (hereinafter, referred to as "C. I.") Direct Black 17, 19, 38, and 154; C. I. Direct Yellow 1, 4, 12, and 29; C. I. Direct Orange 6, 8, 26, and 29; C. I. Direct Red 1, 2, 4, and 13; and C. I. Direct Blue 2, 6, 15, 78, and 87.

Examples of the acidic dyes include C. I. Acid Black 2 and 31; C. I. Acid Yellow 3, 17, 23, and 73; C. I. Acid Orange 10; C. I. Acid Red 13, 14, 18, 27, 52, 73, 87, and 92; and C. I. Acid Blue 1, 9, 74, and 90.

Examples of the basic dyes include C. I. Basic Yellow 2 and 3; C. I. Basic Red 1, 2, 8, and 12; C. I. Basic Violet 1, 3, and 10; and C. I. Basic Blue 5, 9, and 26.

The water-dispersible pigment is not particularly limited as long as it can be dispersed in an aqueous medium, and examples thereof include inorganic pigments such as carbon black and metallic powders; organic pigments such as azo-based, phthalocyanine-based and quinacridone-based pigments; and fluorescent pigments.

The water-based ink composition according to the present embodiment contains water as an aqueous solution or an aqueous dispersion of the ingredients described above, or alternatively separately from the above ingredients. The content of water is preferably from 20 to 80% by mass, and more preferably from 40 to 80% by mass based on the total amount of the water-based ink composition.

The water-based ink composition according to the present embodiment may further comprise a phosphate ester. When the water-based ink composition comprises the phosphate ester, excellent lubricity tend to be able to be obtained without spoiling the drying property of the depicted lines. In addition, when the water-based ink composition comprises the specific phosphate ester described below, the depicted lines tend to be able to be suppressed from bleeding.

The phosphate ester is represented by the following formula (2):

$$O{=}P(OR^2)_p(OH)_{3-p} \quad (2)$$

where, $R^2$ represents an organic group. Examples of the organic group include alkyl groups and aryl groups. The alkyl groups and the aryl groups may be further substituted by an alkoxy group or the like. In the formula (2), p expresses an integer from 1 to 3.

Preferably, the phosphate ester is a polyoxyethylene alkyl ether phosphate. It is noted that the polyoxyethylene alkyl ether phosphate, as used herein, is classified in phosphate esters even when the polyoxyethylene alkyl ether phosphate has a structure of a polyoxyethylene alkyl ether. The polyoxyethylene alkyl ether phosphate is represented by the following formula (3):

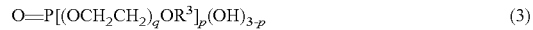

$$O{=}P[(OCH_2CH_2)_qOR^3]_p(OH)_{3-p} \quad (3)$$

where, $R^3$ represents an alkyl group containing 10 or less carbon atoms. The number of carbon atoms of the alkyl group is preferably from 1 to 10, and more preferably from 6 to 10. In the formula (3), p expresses an integer from 1 to 3, and q is suitably selected so as to make dissolution stability of the polyoxyethylene alkyl ether phosphate satisfactory, and is, for example, an integer from 2 to 10. When the number of carbon atoms of the alkyl group of $R^3$ in the polyoxyethylene alkyl ether phosphate is 10 or less, the depicted lines tend to be able to be suppressed from bleeding without spoiling the drying property thereof.

When the water-based ink composition according to the present embodiment comprises the phosphate ester, the content of the phosphate ester is preferably from 0.05 to 5% by mass, and more preferably from 0.5 to 2% by mass based on the total amount of the water-based ink composition. When the content of the phosphate ester is 0.05% or more by mass, lubricity tends to be able to be improved while the drying property of the depicted lines being retained. When the content of the phosphate ester is 5% or less by mass, excellent dissolution stability thereof tends to be able to be attained while the lubricity being retained.

The water-based ink composition according to the present embodiment may contain additives such as, corrosion inhibitors, pH adjusting agents, thickeners, preservatives (antifungal agents), lubricants, dye dissolving auxiliaries and binder resins in addition to the ingredients described above.

Examples of the corrosion inhibitors include benzotriazole and derivatives thereof, tolyltriazole, dicyclohexylammonium nitrite, diisopropylammonium nitrite, sodium thiosulfate, ethylenediaminetetraacetic acid salts, imidazoles, benzimidazoles, saponin and dialkylthioureas. The content of the corrosion inhibitor is preferably from 0.3 to 5% by mass, and more preferably from 0.5 to 3% by mass based on the total amount of the water-based ink composition.

As the pH adjusting agents, inorganic salts such as sodium carbonate, sodium phosphate, sodium hydroxide and sodium acetate; organic basic compounds such as water-soluble amine compounds including triethanolamine and diethanolamine; and the like may be used.

Examples of the thickeners include, as natural materials, xanthan gum, guar gum, locust bean gum, carrageenan, gum arabic, tragacanth gum, alginic acid, gelatin, agar, casein, psyllium seed gum and tamarind seed gum; and, as synthetic materials, methyl cellulose, ethyl cellulose, hydroxyethyl cellulose, carboxymethyl cellulose, carboxymethyl cellulose sodium salt, sodium alginate, polyvinylpyrrolidone, polyvinyl alcohol, polyvinyl methyl ether, sodium polyacrylate and carboxyvinyl polymer. These may be used singly or in combinations of two or more thereof. The content of the thickener is preferably from 0.1 to 3% by mass, and more preferably from 0.2 to 1% by mass based on the total amount of the water-based ink composition. When the content exceeds 3% by mass, the viscosity of the water-based ink composition tends to be excessively increased, thereby easily clogging the pen tip. On the other hand, when the content is less than 0.1% by mass, the viscosity of the water-based ink composition tends to be low, thereby easily causing ink leakage from the tip.

Examples of the preservatives (antifungal agents) include phenol, 1,2-benzisothiazolin-3-one sodium salt, sodium benzoate, sodium dehydroacetate, potassium sorbate, propyl p-hydroxybenzoate and 2,3,5,6-tetrachloro-4-(methylsulfonyl)pyridine. The content of preservative is preferably from 0.1 to 5% by mass, and more preferably from 0.1 to 1% by mass based on the total amount of the water-based ink composition.

Examples of the lubricants include higher fatty acids such as oleic acid, nonionic surfactants having long-chain alkyl groups, polyether-modified silicone oils, and thiophosphite triesters such as tri(alkoxycarbonylmethyl) thiophosphites and tri(alkoxycarbonylethyl) thiophosphites, and metal salts, ammonium salts, amine salts, and alkanolamine salts thereof. The content of the lubricant is preferably from 0.3 to 5% by mass, and more preferably from 0.5 to 3% by mass based on the total amount of the water-based ink composition.

The viscosity of the water-based ink composition according to the present embodiment is preferably from 500 to 3000 mPa·s, and more preferably from 1000 to 2000 mPa·s at 25° C. and a shear rate of 0.75 s$^{-1}$. When the viscosity is 500 mPa·s or more, ink leakage from the tip tends to hardly occur, thereby reducing the bleed of the depicted lines. When the viscosity is 3000 mPa·s or less, excellent permeability of the water-based ink composition into the paper tends to be obtained.

The water-based ink composition according to the present embodiment may be obtained by mixing the polyoxyethylene alkyl ether, the water-soluble organic solvent, the colorant and water, and the phosphate ester or the additives, as necessary, using an agitator, for example, a dissolver, a Henschel mixer and a homomixer. The agitating conditions of the agitator are not particularly limited, but the water-based ink composition in which the individual ingredients are homogeneously dispersed may be obtained by, for example, agitating the individual ingredients using a dissolver at a rotational frequency from 100 to 1000 rpm for 30 to 180 minutes.

(Water-based Ballpoint Pen)

FIG. 1 is a schematic cross-sectional view showing the water-based ballpoint pen according to the present embodiment. In a ballpoint pen 100 shown in FIG. 1, a water-based ink composition 12 is charged (housed) within an ink housing member 14. A ballpoint pen tip 20 is attached to an end of the ink housing member 14. This ballpoint pen tip 20 consists of a ball holder 24 and a ball 26 rotatably held with the ball holder 24, and is fixed to the ink housing member 14 via a joint 25. In the ink housing member 14, a backflow preventer 16 is housed in a state adjacent to the water-based ink composition 12 on the opposite side to the ballpoint pen tip 20 side. In this constitution, the backflow preventer 16 is disposed so as to make no space with the water-based ink composition 12.

In addition, in the ballpoint pen 100, a core 10 is constituted of the ink housing member 14, the joint 25, the ballpoint pen tip 20, the water-based ink composition 12 and the backflow preventer 16, the core 10 is mounted to a main body shaft 18, and further a tail plug 28 with a vent hole is attached to the tail end (an end on the opposite side to the ballpoint pen tip 20) of the main body shaft 18.

Hereinafter, the components of the ballpoint pen 100 will be described, but common constitution used in the conventional ballpoint pens may be used for such components except for the water-based ink composition 12. The water-based ink composition according to the above-described embodiment is used for the water-based ink composition 12.

For the ink housing member 14, those formed of a resin such as, polypropylene, polyethylene, polyethylene terephthalate, nylon, polyacetal or polycarbonate, or a metal may be used. The shape of the ink housing member 14 is not particularly limited, and may be a shape such as a cylindrical shape.

The backflow preventer 16 has a function to prevent the water-based ink composition from flowing out (flow out preventing property), a function to prevent the water-based ink composition from drying up (sealing property) and the like, and the known backflow preventers having such functions may be used without particular limitation. Such the backflow preventer 16, for example, is constituted by containing a base oil and a thickener. Examples of the base oil include mineral oils, polybutenes, silicone oils, glycerol and polyalkylene glycols. Examples of the thickener include metallic soap-based thickeners, organic thickeners and inorganic thickeners.

It is noted that the viscosity of the backflow preventer 16 and the difference in the specific gravities between the water-based ink composition 12 and the backflow preventer 16 are preferably adjusted so that the backflow preventer 16 does not sink into the water-based ink composition 12 when the ballpoint pen tip is directed downward. In addition, preferably the backflow preventer 16 has a composition incompatible to the water-based ink composition 12.

For the main body shaft 18 and the tail plug 28, those formed of a plastic material such as polypropylene may be used, respectively.

For the joint 25, those formed of, for example, polypropylene, polyethylene, polyethylene terephthalate, nylon, polyacetal, polycarbonate or the like may be used.

For the joint 25, and the ball holder 24 and the ball 26 in the ballpoint pen tip 20, those commonly used in the conventional ballpoint pens may be used, respectively. Preferably, the diameter of the ball 26 is from 0.3 to 1.2 mm The ballpoint pen 100 according to the embodiment having the constitution described above may be manufactured by the conventional method for manufacturing a ballpoint pen or the like except for the water-based ink composition.

In the above, there have been described the water-based ink composition according to the present invention and the water-based ballpoint pen in which the water-based ink composition is charged, but the water-based ink composition and the water-based ballpoint pen are not limited to the embodiments described above. For example, the water-based ballpoint pen may not have the main body shaft 18 and the ink housing member 14 itself may be a main body shaft. Furthermore, the ballpoint pen according to the embodiment described above may be one having a pressurizing mechanism such that the water-based ink composition and the backflow preventer in the ink housing member 14 are in a state of being pressurized from the tail end side (the end on the opposite side to the ballpoint pen tip 20). In addition, the water-based ballpoint pen according to the embodiment described above may not have the backflow preventer 16.

EXAMPLES

Hereinafter, the present invention will be specifically described, providing examples, but the scope of the present invention is not limited to these examples.

[Preparation of Water-based Ink Composition]

Example 1

0.5 part by mass of a polyoxyethylene alkyl ether, 1.0 part by mass of a phosphate ester, 30.0 parts by mass of a colorant, 0.1 part by mass of a corrosion inhibitor, 0.5 part by mass of a pH adjusting agent, 0.5 part by mass of a thickener, 15.0 parts by mass of a water-soluble organic solvent and 52.4 parts by mass of water were mixed to obtain a water-based ink composition.

As the polyoxyethylene alkyl ether, NONION EH208 (polyoxyethylene-2-ethylhexyl-ether, HLB 14.6, NOF Corporation) was used. As the phosphate ester, PLYSURF A208F (polyoxyethylene-2-ethylhexyl-ether phosphate, DKS Co. Ltd.) was used. As the colorant, WATER BLACK 191-L 15% sol. (black color dye, 15% by mass aqueous solution, Orient Chemical Industries Co., Ltd.) was used. As the corrosion inhibitor, tolyltriazole was used. As the pH adjusting agent, triethanolamine was used. As the thickener, xanthan gum was used. As the water-soluble organic solvent, propylene glycol was used.

Examples 2 to 4 and Comparative Examples 1 to 6

Water-based ink compositions of Examples 2 to 4 and Comparative Examples 1 to 6 were obtained through the same procedures as those in Example 1 except that the types and the amounts (part by mass) of the ingredients to be mixed with each other were changed to those as set forth in the following Tables 1 and 2.

The compositions and the viscosities of the water-based ink compositions of Examples 1 to 4 and Comparative Examples 1 to 6 are set forth together in Tables 1 and 2. The unit for the numerical values in the tables is part by mass unless otherwise stated. The viscosities of the water-based ink compositions are the measured values obtained under the following conditions.

<Viscosity Determination Conditions>

Apparatus: BROOKFIELD VISCOMETER DV-11+ Pro
Temperature: 25° C.
Rotational frequency: 0.1 rpm (shear rate: 0.75 s$^{-1}$)

TABLE 1

|  |  | Example | | | |
|---|---|---|---|---|---|
|  |  | 1 | 2 | 3 | 4 |
| Polyoxyethylene alkyl ether | NONION EH208 | 0.5 | — | — | 0.5 |
|  | NOIGEN SD80 | — | 0.5 | — | — |
|  | DKS NL-90 | — | — | 0.5 | — |
| Phosphate ester | PLYSURF A208F | 1.0 | — | — | 1.0 |
|  | PHOSPHANOL RA600 | — | 1.0 | — | — |
|  | PLYSURF A210D | — | — | 1.0 | — |
| Colorant | WATER BLACK 191-L 15% sol. | 30.0 | 30.0 | 30.0 | — |
|  | DAIWA BLUE 300L 13% sol. | — | — | — | 30.0 |
| Corrosion inhibitor | Tolyltriazole | 0.1 | 0.1 | 0.1 | 0.1 |
| pH adjusting agent | Triethanolamine | 0.5 | 0.5 | 0.5 | 0.5 |
| Thickener | Xanthan gum | 0.5 | 0.5 | 0.5 | 0.5 |
| Water-soluble organic solvent | Propylene glycol | 15.0 | 15.0 | 15.0 | 15.0 |
| Water |  | 52.4 | 52.4 | 52.4 | 52.4 |
| Viscosity (mPa · s) |  | 1536 | 1733 | 1504 | 1458 |

TABLE 2

|  |  | Comparative Example | | | | | |
|---|---|---|---|---|---|---|---|
|  |  | 1 | 2 | 3 | 4 | 5 | 6 |
| Polyoxyethylene alkyl ether | NONION EH204 | 0.5 | — | — | — | — | — |
|  | NOIGEN SD30 | — | 0.5 | — | — | — | — |
|  | NOIGEN SD110 | — | — | 0.5 | — | — | — |
|  | NONION E205 | — | — | — | 0.5 | — | — |
|  | DKS NL-50 | — | — | — | — | 0.5 | — |
|  | DKS NL-180 | — | — | — | — | — | 0.5 |
| Phosphate ester | PLYSURF A208F | 1.0 | — | — | 1.0 | — | — |
|  | PHOSPHANOL RA600 | — | 1.0 | — | — | 1.0 | — |
|  | PLYSURF A210D | — | — | 1.0 | — | — | 1.0 |
| Colorant | WATER BLACK 191-L 15% sol. | 30.0 | 30.0 | 30.0 | — | — | — |
|  | DAIWA BLUE 300L 13% sol. | — | — | — | 30.0 | 30.0 | 30.0 |
| Corrosion inhibitor | Tolyltriazole | 0.1 | 0.1 | 0.1 | 0.1 | 0.1 | 0.1 |
| pH adjusting agent | Triethanolamine | 0.5 | 0.5 | 0.5 | 0.5 | 0.5 | 0.5 |
| Thickener | Xanthan gum | 0.5 | 0.5 | 0.5 | 0.5 | 0.5 | 0.5 |
| Water-soluble organic solvent | Propylene glycol | 15.0 | 15.0 | 15.0 | 15.0 | 15.0 | 15.0 |
| Water |  | 52.4 | 52.4 | 52.4 | 52.4 | 52.4 | 52.4 |
| Viscosity (mPa · s) |  | 1700 | 1536 | 1569 | 1381 | 1258 | 1356 |

The details of the compounds set forth in Tables 1 and 2 are as follows:

NONION EH204: polyoxyethylene-2-ethylhexyl-ether, HLB 11.5, NOF Corporation

NONION E205: polyoxyethylene oleyl ether, HLB 9.0, NOF Corporation

NOIGEN SD30: polyoxyethylene isodecyl ether, HLB 10.1, DKS Co. Ltd.

NOIGEN SD80: polyoxyethylene isodecyl ether, HLB 14.3, DKS Co. Ltd.

NOIGEN SD110: polyoxyethylene isodecyl ether, HLB 15.5, DKS Co. Ltd.

DKS NL-50: polyoxyethylene lauryl ether, HLB 10.6, DKS Co. Ltd.

DKS NL-90: polyoxyethylene lauryl ether, HLB 13.4, DKS Co. Ltd.

DKS NL-180: polyoxyethylene lauryl ether, HLB 16.1, DKS Co. Ltd.

PHOSPHANOL RA600: polyoxyethylene alkyl (C6-10) ether phosphate, Toho Chemical Industry Co., Ltd.

PLYSURF A210D: polyoxyethylene alkyl (C10) ether phosphate, DKS Co. Ltd.

DAIWA BLUE 300L 13% sol.: blue color dye, 13% aqueous solution by mass, Daiwa Kasei Kogyo.

[Water-based Ink Composition Evaluation]

The water-based ink compositions obtained in Examples 1-4 and Comparative Examples 1-6 were charged into ink housing members in ballpoint pens shown in FIG. 1 to manufacture ballpoint pens having a ball with a diameter of 0.5 mm, respectively. In the same manner, ballpoint pens having a ball with a diameter of 0.7 mm were manufactured from the water-based ink compositions obtained in Examples 1 to 4 and Comparative Examples 1 to 6, respectively. The evaluation described below for each water-based ink composition was carried out using each resulting water-based ballpoint pen. The evaluation results are set forth in Table 3.

(Depicted Line Drying Property)

Surface of letters handwritten on the woodfree paper with each water-based ballpoint pen described above was rubbed with a commercially available cotton swab, and a required time from writing until no transfer of the water-based ink composition to the cotton swab occurs was measured under an environment at 25° C. and a humidity of 60% RH. The required time until no transfer of the water-based ink composition occurs was ranked according to the following evaluation criteria and the drying property of the depicted lines for each example was judged.

A: the required time from writing until no transfer of the water-based ink composition occurs is 2 seconds or less.

B: the required time from writing until no transfer of the water-based ink composition occurs exceeds 2 seconds.

(Depicted Line Bleed)

Reference water-based ballpoint pens corresponding to Examples 1 to 4 and Comparative Examples 1 to 6, respectively, were manufactured in the same manner as that described above using water-based ink compositions obtained in the same manners as those in Examples 1 to 4 and Comparative Examples 1 to 6, respectively, except that the polyoxyethylene alkyl ethers were not used. Straight lines were mechanically drawn on the woodfree paper using the above-described water-based ballpoint pens obtained from the respective water-based ink compositions of Examples and Comparative Examples and the reference water-based ballpoint pens corresponding thereto, respectively, and then the width of each drawn line was determined. The load of the mechanical drawing was 100 g. The value (line width ratio) obtained by dividing the width of the line drawn with the water-based ballpoint pen obtained from each of the water-based ink compositions of the Examples and Comparative Examples by the width of the line drawn with each corresponding reference water-based ballpoint pen was calculated, and the depicted line bleed was ranked according to the following evaluation criteria.

A: the line width ratio is less than 1.1 and the depicted line bleed is small.

B: the line width ratio is 1.1 or more and the depicted line bleed is large.

TABLE 3

| | | Example | | | | Comparative Example | | | | | |
|---|---|---|---|---|---|---|---|---|---|---|---|
| | | 1 | 2 | 3 | 4 | 1 | 2 | 3 | 4 | 5 | 6 |
| Ball diameter 0.5 mm | Depicted line drying property | A | A | A | A | A | A | B | B | B | B |
| | Depicted line bleed | A | A | A | A | B | B | A | A | B | A |
| Ball diameter 0.7 mm | Depicted line drying property | A | A | A | A | B | B | B | B | B | B |
| | Depicted line bleed | A | A | A | A | B | B | A | A | B | A |

From the evaluation results set forth in Table 3, the water-based ink compositions obtained in Examples 1 to 4 were confirmed to be capable of forming depicted lines excellent in the drying property and with little bleed.

INDUSTRIAL APPLICABILITY

The water-based ink composition according to the present invention is applied to writing instruments, ballpoint pens and printing instruments such as ink jet, and particularly suitably applied to ballpoint pens.

REFERENCE SIGNS LIST

10: core, 12: water-based ink composition, 14: ink housing member, 16: backflow preventer, 18: main body shaft, 20: ballpoint pen tip, 24: ball holder, 25: joint, 26: ball, 28: tail plug, 100: ballpoint pen

The invention claimed is:

1. A water-based ink composition for ballpoint pen comprising a polyoxyethylene alkyl ether, a water-soluble organic solvent, a colorant and water, wherein an HLB value of the polyoxyethylene alkyl ether is from 14 to 15, and wherein the polyoxyethylene alkyl ether has an alkyl group containing 8 to 10 carbon atoms.

2. The water-based ink composition according to claim 1, wherein a content of the polyoxyethylene alkyl ether is from 0.1 to 10% by mass based on a total amount of the water-based ink composition.

3. The water-based ink composition according to claim 1 further comprising a phosphate ester.

4. The water-based ink composition according to claim 3, wherein the phosphate ester is a polyoxyethylene alkyl ether phosphate, and wherein the polyoxyethylene alkyl ether phosphate has an alkyl group containing 10 or less carbon atoms.

5. The water-based ink composition according to claim 3, wherein a content of the phosphate ester is from 0.05 to 5% by mass based on a total amount of the water-based ink composition.

6. The water-based ink composition according to claim 1, wherein the water-based ink composition has a viscosity from 500 to 3000 mPa·s.

7. A water-based ballpoint pen comprising an ink housing member and a ballpoint pen tip, wherein the water-based ink composition according to Claim 1 is housed in the ink housing member.

* * * * *